(12) United States Patent
Innala et al.

(10) Patent No.: US 7,584,674 B2
(45) Date of Patent: Sep. 8, 2009

(54) ON-LINE MEASUREMENT FOR A PRESSURE PROFILE

(75) Inventors: Matti Innala, Järvenpää (FI); Tatu Pitkänen, Järvenpää (FI); Petteri Lannes, Jokela (FI); Topi Tynkkynen, Vantaa (FI); Petri Päivä, Järvenpää (FI); Marko Tiilikainen, Kellokoski (FI)

(73) Assignee: Metso Paper, Inc., Helsinki (FI)

( * ) Notice: Subject to any disclaimer, the term of this patent is extended or adjusted under 35 U.S.C. 154(b) by 149 days.

(21) Appl. No.: 11/778,409

(22) Filed: Jul. 16, 2007

(65) Prior Publication Data

US 2008/0022764 A1      Jan. 31, 2008

Related U.S. Application Data

(63) Continuation of application No. PCT/FI2006/050028, filed on Jan. 17, 2006.

(51) Int. Cl.
    *G01L 5/00* (2006.01)
(52) U.S. Cl. ...................... 73/862.55; 73/159
(58) Field of Classification Search ............... 73/862.55, 73/159
    See application file for complete search history.

(56) References Cited

U.S. PATENT DOCUMENTS

| | | | | |
|---|---|---|---|---|
| 5,379,652 | A * | 1/1995 | Allonen | 73/862.55 |
| 5,383,371 | A * | 1/1995 | Laitinen | 73/862.55 |
| 5,562,027 | A | 10/1996 | Moore | |
| 5,592,875 | A | 1/1997 | Moschel | |
| 5,804,707 | A * | 9/1998 | Scarton et al. | 73/82 |
| 6,997,106 | B1 | 2/2006 | Holopainen et al. | |
| 7,444,862 | B2 * | 11/2008 | Innala et al. | 73/159 |
| 2002/0179270 | A1 | 12/2002 | Gustafson et al. | |
| 2003/0144119 | A1 | 7/2003 | Kleiser et al. | |
| 2004/0079147 | A1 | 4/2004 | Mäenpää | |

FOREIGN PATENT DOCUMENTS

| | | |
|---|---|---|
| EP | 1 477 315 A1 | 11/2004 |
| EP | 1 493 565 A2 | 1/2005 |
| WO | WO 01/73197 A1 | 10/2001 |
| WO | WO 2004/102141 A2 | 11/2004 |

OTHER PUBLICATIONS

*Ullmann's Encyclopedia of Industrial Chemistry*, 6th ed., vol. 8, (Polyacrylates to Polyurethanes), 2003, Wiley-VCH, Weinheim, pp. 706.

* cited by examiner

*Primary Examiner*—Max Noori
(74) *Attorney, Agent, or Firm*—Alston & Bird LLP

(57) ABSTRACT

A method for measuring a nip pressure and/or a pressure profile is provided, wherein a nip-forming roll is fitted with a pressure sensor under a coating layer which is protective and functions as a spring on top of the sensor, and the nip pressure delivers to the bottom surface of the coating a deformation proportional to the nip pressure and the deformation compresses the sensor, which responds to the deformation by generating an electric signal.

14 Claims, No Drawings

ON-LINE MEASUREMENT FOR A PRESSURE PROFILE

CROSS-REFERENCE TO RELATED APPLICATIONS

This is a continuation of PCT/FI2006/050028, filed Jan. 17, 2006, which International Application was published by the International Bureau in English on Jul. 20, 2006, and also claims the benefit of Finnish Priority Application No. 20055020, filed Jan. 17, 2005, all of which are incorporated by reference herein in their entirety.

BACKGROUND OF THE INVENTION

1. Field of the Invention

The application relates to measuring a nip load profile and to a roll intended for measuring the profile. The roll can be used in a paper, board or tissue machine, in a press, calender, coating station, reeler, winder, printing press and the like. In addition to rolls needed in the process of plastic film manufacture and lamination, the measurement of a nip pressure profile provides benefits in chipboard lines, pulp sheet lines, in the production of various building boards, including concrete, plaster and ceramic boards. The nip can be for example between two or more rolls, between a tensioned belt and a roll or between a rigid board and a roll.

2. Description of Related Art

A nip is formed when a web or a bulk material in the form of sheets is pressed with a roll, a belt, a shoe or the like element. Thus, the nip may comprise a roll-pressing belt or two opposing rolls, and between the actual product to be manufactured or pressed and the pressing roll or other element may travel a felt or a wire or an imprint-delivering board or belt. Hence, the nip is not just a press zone between two rolls.

Documents dealing with the topic include at least EP642460 and EP517830. The latter proposes mounting a pressure sensor on a roll surface for measuring a nip pressure, but the practical equipment according to that application did not work too well.

DETAILED DESCRIPTION OF THE INVENTION

According to one embodiment of the invention, a nip-load measuring roll is fitted with an EMFi-film pressure sensor and it is shielded by a cold-curing polymer coating, which has a co-function as the roll surface and, regarding a nip pressure measurement, also as a stiffening spring, prohibiting excessive roll surface strains within the nip zone and protecting the sensor from high localized stresses. Preferably, the sensor is fitted for example in an inclined groove cut in the roll or, in the case of a multi-element sensor, the sensor can also be mounted co-directionally with the nip or as a ring around the sensor.

The sensor is topped by one or more coating layers. Instead of a cut groove, use can be made of a cold-curing coating of considerable thickness, the sensor being embedded therein and a bulge possibly caused by the sensor being flattened by grinding. Another possibility is the use of two coating layers, the bottom one being provided with a groove for the sensor. In this case, the first layer can be hot-curing as well, provided that it is installed before the EMFi sensor or some other such pressure sensor. One preferred approach is to use a coating having elastic or resilient properties consistent with those of an EMFi film, whereby the layer, which covers the EMFi film sensors, has a consistent elasticity over its entire surface area.

The bottom layer can be formed with a groove, for example by having the surface, at the spot coinciding with the future location of a subsequently mounted sensor, taped with metal strips of the same width as the sensor, the finishing of said bottom layer being followed by cutting the coating edges along the strips and by lifting the strips off to provide groove of the same width as the sensor.

The EMFi film is useful for detecting pressure or motion and has a high sensitivity even to a slight motion. Thus, even with a slight compression, it produces a reasonably powerful signal. In addition, the film has a rapid response. The sensor and the coating work together as a spring, which must be designed for such a stiffness that the sensor is subjected to a deformation sufficient for conducting a measurement, yet the nip does not yield too much relative to its surroundings. The surrounding structures must not cause friction or inertia. Friction leads to warming and, if a structural restoration after compression is retarded by friction, the measuring resolution or precision is compromised. It should be noted that, since the response provided by an EMFi film is the same from each section of the film, a part of the sensor's width may end up in a dead zone regarding the nip compression. This declines the sensitivity, but does not necessarily impair the precision of measurement. Thus, a groove-fitted sensor provides a reproducible and precise response, even if a part of the sensor's width should remain unused.

A good online measuring solution for the measurement of a nip load profile is yet to be found. To perform a successful measurement requires that several problems be resolved. A pressure sensor must be found, which is capable of sustaining required forces and temperature conditions for a sufficiently long service life. The sensor must be mounted on a nip-forming roll while keeping the roll smooth and adequately homogeneous in terms of its properties. A capability of reading and processing a sensor-produced signal must be provided in order to produce measurement data.

As a sensor, the EMFi film is beneficial. It is by nature a dynamic-shift measuring element and the measurement takes place over the entire area of a sensor at equal rating. Consequently, the EMFi sensor is capable of measuring the magnitude of a dot-like force as it wanders within the sensor area. Because the sensor measures a dynamic force and, in electrical sense, the sensor is a capacitor, it is preferred that the sensor voltage be set to zero in its normal mode to prevent the sensor voltages from crawling. Preferably, the sensor voltage is measured with a high-impedance voltmeter or, alternatively, a low-impedance ammeter can be used for providing a current rate proportional to a shift of force. In the practical process of measuring a nip pressure, the measurement of electric current actually measures a time derivative of the pressure, not the nip pressure as such, and therefore, in a practical implementation of power measurement, the measurement should be integrated if an absolute value is desired at each instant of time. This can be done analogically with a charge amplifier type amplifier or digitally by calculating the integral numerically.

The sensor-produced signal must be sampled for further processing and transmitted forward from the roll preferably in a wireless mode. The further processing is facilitated by always having the same number of samples per revolution of the roll, the respective samples representing always the same spot of the nip. This is accomplished either by measuring the roll angle and by synchronizing the sampling with rotation of the roll. Synchronization can be effected for example by a standard pulse-interval angle detector, which is further provided with a separate sensor for point zero. Another approach is to conduct measuring always at a sampling rate higher than the measuring resolution and to effect calculation numerically by working out averages for the samples of a given sector, possibly by weighting the mid-section of a sample or simply by choosing appropriate samples, whose location is always approximately constant within a revolution of the roll. The latter approach is simple, but it fails to provide a noise reduction which is obtained by an average of several samples.

A suitable sensor configuration is an angular spiral. Thus, over each section thereof presently under the nip, the sensor produces a response which is proportional to the pressure. The hypothesis here is that the rest of the sensor is not under compression or has a constant force applied to it. The received signal is supplied to an amplifier that may rotate along with the roll and, finally, the signal is delivered to processing. The signal can be transmitted from a rotating roll by way of a wireless communication, for example by an IRDA or Bluetooth transmitter or a specifically tailored transmitter. The transmitter may also operate by way of an induction loop at a relatively low radio frequency, whereby the signal does not go far.

In order to enable it to sustain the pressure load, a roll-mounted sensor has to be protected with a suitable coating and preferably embedded in a groove, whereby the sensor will have a longer service life and its mounting will be easier, nor is there a need for grinding the coating flat for the sake of a bulge created by the sensor. The sensor must have a flat mounting base, this being accomplished preferably by making a groove in the roll surface, for example by taping strip to the roll surface, by coating the roll with an appropriate composite and by tearing the strip off before the composite is set, or by cutting or milling along the sides of the strip to detach the coating that holds the strip edges. Consequently, the original roll surface is exposed and the strip can be secured thereto, for example by thin two-sided tape, a size or by providing the bottom of the actual sensor with a face tape.

As the case may be, the bottom coating formed like this may consist of a material which is relatively hard or has an elasticity equal to the sensor itself. In the event that the coating which makes up the sides of a groove is substantially harder than the sensor, the coating to be overlaid shall constitute a spring transmitting the nip force to the sensor. In this case, the sensor does not experience stresses as high as in the previous case, and the embodiment is useful for high nip pressures. In the nip, the site of a sensor is somewhat softer than its surroundings. Not much lateral forces will be transmitted to the sensor, the sensor's sensitivity depending on the hardness, stiffness and thickness of a coating to be overlaid, the shape, depth and width also having an effect on the sensitivity.

When applied in relation to the reeler or winder of a paper machine, the range of useful coating hardnesses is for example 10-130 P&J and that of coating thickness is 13-25 mm. In the case of a film coater, the coating hardness is for example within the range of 15-35 P&J and the range of thickness is 18-25 mm, respectively. The coating hardness applicable to the press of a paper machine is for example 10-50 P&J and the thickness is 13-30 mm.

In a film coater, the roll is loaded by coating color applicator elements and by a nip, in which the coating film applied on the roll is sized to the web. The measurement of an angular sensor adds up all forces applied to the sensor and, hence, if a sensor is subjected to the force of several nips, no information will be obtained regarding the pressure profile of an individual nip. That is why the sensor of a film coater preferably has an overlap angle which is less than the shorter spacing between a blade bar and a nip along the roll periphery. Thus, the sensor is only exposed to the action of one force-generating element at a time. The sensor is set to zero while being in a clear space like in the process of measuring a single nip. Setting to zero can be effected after every nip prior to the sensor ending up under the next nip, which means that the sensor is at zero before every nip, resulting in the preceding nip having less effect on the measuring result. The sensor's adjustment to zero can also be effected after measuring two or even more nips, whereby more time is afforded for zeroing and the sensor's overlap angle can be made smaller as there is no need for reserving time for a zero adjustment between two close-by nips. It depends on the relative loads of the nips and the qualities of a sensor as to which way provides a more accurate result. In the latter way, the forces of a nip following the first zero adjustment may have more impact on subsequent measurements, yet the resolution of a cross-profile is improved respectively because the sensor's overlap angle can be increased.

In reference to a film coater, the above-mentioned capability of measuring two nips in real time during a run constitutes a substantial advantage, because this enables for the first time to obtain real-time information about a crosswise force profile during the process. Furthermore, it is indeed in conjunction with a film coater that the extensive dynamics of an EMFi-film allows for the measurement of minor and major forces at high precision, the earlier sensor technologies not affording that sort of extensive measuring dynamics. The sampling can be effected in scale for various nips, i.e. the preamplification of an AD-converter can be reduced during the measurement of a compressing nip, enabling the measurement of both forces at a high resolution.

Adding a sensor of the invention onto the roll of a film transfer coater provides a possibility of automating the manually adjusted rolls of earlier coaters with a minor investment, just the measuring electronics being added in conjunction with the replacement of a roll coating, and the adjustment of spindles is feasible more easily and precisely as a display-controlled manual adjustment or by adding automated actuators for the adjustment of spindles, as well.

In the case of a two-sided coater, a sensor system is mounted on both rolls. In theory, it is also feasible to measure the pressure profile of a nip common for two rolls and to subtract the result from the measurements of both rolls to obtain the pressure profiles of nips not common for both rolls. However, the method is inaccurate in the event that the pressures of a common nip exceed those of non-common nips.

It is also possible to make a grooved soft coating, which has an elasticity equal to that of the sensor, the underlying coating yielding under a subsequently overlaid coating. This provides an increased nip length. At the same time, the roll surface is more consistent in quality, nor does the sensor produce a site that would be softer than the rest of the roll. The solution produces a few more lateral forces on the sensor, and the sensor has a sensitivity which is higher than in the case of a hard groove. In this case, the space resolution of a sensor may suffer as the top coating layer upon a soft coating transmits forces over a larger area and the sensor may experience also pulling forces on either side of the nip. On the other hand, this method enables the mounting of several sensors or even the entire roll area can be covered with sensors, whereby the sensors themselves constitute one layer of the coating. A wiring, which is made of a thin EMFi film as a matrix sensor and provided on the surface of a flexible circuit board or a roll and a sensor, enables measuring all forces of the entire roll from under the coating layer.

In order to maintain the sensor intact during a coating process, it has been discovered that a preferred topmost coating material is cold-curing polyurethane, which has good elastic properties and low-loss in its function as a spring transmitting forces to the sensor. Neither does the manufacturing process of a polyurethane coating necessitate high temperatures, which the sensor would not be able to sustain. Also other thermoplastics, composites or rubbers, which set at low temperatures, can be used as a coating. Typically, the possible plastics and composites feasible as a coating can be two- or multi-component thermosetting plastics, which set without heating to a high temperature. Heat is usually generated during the plastic-setting chemical reaction itself, but temperature during a coating process is less than 100° C., preferably less than 70° C. A non-setting cast compound can be heated for increased fluidity to a temperature higher than room temperature before injecting or casting the compound, but the compound cools down at a relatively fast rate. In the event that the generation of heat during a casting process is excessive, the casting can be subjected to active cooling during setting or the coating can be injected as thin layers. It is also possible to employ plastics setting in response to ultraviolet radiation, in which case it is also possible to use a single-component plastic. Ordinary thermoplastics are only useful as an exception, because usually, during a casting process thereof, temperatures higher than those mentioned above are needed and, if the casting temperature is sufficiently low, the elastic properties of plastic undergo a drastic change at a normal working temperature, i.e. the plastic becomes too soft even at a relatively low temperature, and the viscous softening promotes the heating of a coating even further as a result of friction losses.

Associated with the sensor are deformations, which develop as the nip applies pressure on a coating and the coating is yielding. In terms of its surface hardness and properties, the coating must be suitable for each nip, but on the other hand the coating must have a sufficient flexibility for transmitting to the sensor a force generated by the nip pressure. In addition, the internal friction of a coating must be sufficiently low, such that the coating does not become locally heated around the sensor as a result of friction.

The coatings protecting a sensor and/or providing a groove can be made of one or different materials, the number of layers can be two or more, and the coating layer may also lie under the sensor.

Coating hardnesses are in the order of 1-250 P&J, preferably within the range of 10-130 P&J. Appropriate hardnesses vary according to intended application, with more powerful forces justifying the use of thicker and less flexible hard coatings. The coating has its thickness within the range of 0.1-60 mm, preferably 5-40 mm.

That which is claimed:

1. A method for measuring at least one of a nip pressure and a pressure profile in a nip, using at least one nip-forming roll having a film pressure sensor covered by at least one coating layer, the at least one coating layer being protective and resilient with respect to the film pressure sensor, said method comprising:

receiving the film pressure sensor in a groove associated with the at least one nip-forming roll;

applying a topmost coating layer of the at least one coating layer over the film pressure sensor; and applying a pressure within the nip to the topmost layer of the at least one coating layer so as to deform the at least one coating layer and compress the film pressure sensor, the deformation being proportional to the pressure, and the film pressure sensor generating an electric signal in response to the deformation, wherein the at least one coating layer consists of a cold-curing polymer including at least one of a soft polyurethane and a composite thereof, the cold-curing polymer having a cured hardness of between about 1 P&J and about 250 P&J, and preferably between about 10 P&J and about 130 P&J.

2. A method as set forth in claim 1, further comprising forming the groove by coating a roll, without coating a desired region thereof, with at least one of the at least one coating layer, except the topmost coating layer, the at least one of the at least one coating layer about the desired region of the roll thereby defining the groove.

3. A method as set forth in claim 1, further comprising forming the groove by coating a roll with at least one of the at least one coating layer, except the topmost coating layer, and then removing a portion of the at least one of the at least one coating layer from a desired region thereof, the at least one of the at least one coating layer about the desired region thereby defining the groove.

4. A method as set forth in claim 1, further comprising forming the groove by coating a roll, having a strip disposed thereon over a desired region, with at least one of the at least one coating layer, except the topmost coating layer, and then removing the strip from the desired region before the at least one of the at least one coating layer cures.

5. A method as set forth in claim 1, further comprising forming the groove by coating a roll with at least one of the at least one coating layer, except the topmost coating layer, and then machine-removing a portion thereof from a desired region of the roll, the at least one of the at least one coating layer about the desired region of the roll thereby defining the groove.

6. A method as set forth in claim 1, wherein the film pressure sensor is configured as an elongate strip, and the method further comprises spirally mounting the strip on the roll along a width thereof, such that at least a portion of the film pressure sensor is subjected to the nip pressure as the at least one nip-forming roll is rotated, the spirally-mounted film pressure sensor thereby being configured to measure a crosswise pressure profile of the nip as the at least one nip-forming roll is rotated.

7. A method as set forth in claim 1, wherein the at least one coating layer has a thickness of between about 0.1 mm and about 130 mm, and preferably between about 5 mm and about 40 mm.

8. A method as set forth in claim 1, wherein the at least one coating layer comprises the topmost coating layer and at least one underlying coating layer, the at least one underlying coating layer being less elastic than the topmost coating layer.

9. A method as set forth in claim 1, wherein the at least one coating layer comprises the topmost coating layer and at least one underlying coating layer, the at least one underlying coating layer being more elastic than the topmost coating layer.

10. A method as set forth in claim 1, wherein the film pressure sensor is configured as a matrix sensor for measuring the pressure applied to the at least one nip-forming roll in the nip according to a coordinate system.

11. A method as set forth in claim 1, further comprising calibrating the electrical signal generated by the film pressure sensor with respect to a signal output by a heat sensor disposed in proximity thereto.

12. A method as set forth in claim 1, wherein applying a pressure further comprises applying a pressure within the nip to the topmost coating layer of the at least one coating layer so as to deform the at least one coating layer and compress a plurality of film pressure sensors, the plurality of film pressure sensors being at least one of oriented in different directions and configured in different configurations.

13. An apparatus for measuring at least one of a nip pressure and a pressure profile in a nip, comprising:

a nip-forming roll having a film pressure sensor received in a groove associated with the nip-forming roll, the film pressure sensor being covered by a topmost coating layer of at least one coating layer, the at least one coating layer being protective and resilient with respect to the film pressure sensor, wherein pressure within the nip deforms the topmost coating layer of the at least one coating layer and compresses the film pressure sensor, the deformation being proportional to the pressure, and the film pressure sensor generating an electric signal in response to the deformation, wherein the at least one coating layer consists of a cold-curing polymer including at least one of a soft polyurethane and a composite thereof, the cold-curing polymer having a cured hardness of between about 1 P&J and about 250 P&J, and preferably between about 10 P&J and about 130 P&J.

14. An apparatus as set forth in claim 13, wherein the roll is incorporated into at least one of a reeler, a press, a film coater, a winder, and a calender.

* * * * *

UNITED STATES PATENT AND TRADEMARK OFFICE
CERTIFICATE OF CORRECTION

PATENT NO. : 7,584,674 B2  Page 1 of 1
APPLICATION NO. : 11/778409
DATED : September 8, 2009
INVENTOR(S) : Innala et al.

It is certified that error appears in the above-identified patent and that said Letters Patent is hereby corrected as shown below:

Title page,

Insert the following,

Item --(30)   Foreign Application Priority Data

January 17, 2005 (FI) ................20055020--.

Signed and Sealed this

Twelfth Day of January, 2010

David J. Kappos
*Director of the United States Patent and Trademark Office*